United States Patent
Cash

(10) Patent No.: US 10,141,872 B2
(45) Date of Patent: Nov. 27, 2018

(54) MOTOR DRIVE CIRCUITRY

(71) Applicant: TRW Limited, Solihull, West Midlands (GB)

(72) Inventor: Ian James Cash, Ashbourne (GB)

(73) Assignee: TRW Limited, West Midlands (GB)

( * ) Notice: Subject to any disclaimer, the term of this patent is extended or adjusted under 35 U.S.C. 154(b) by 0 days.

(21) Appl. No.: 15/510,543

(22) PCT Filed: Sep. 9, 2015

(86) PCT No.: PCT/GB2015/052604
§ 371 (c)(1),
(2) Date: Mar. 10, 2017

(87) PCT Pub. No.: WO2016/038362
PCT Pub. Date: Mar. 17, 2016

(65) Prior Publication Data
US 2017/0264221 A1     Sep. 14, 2017

(30) Foreign Application Priority Data

Sep. 10, 2014 (GB) .................................. 1416011.3

(51) Int. Cl.
*H02P 6/12* (2006.01)
*H02H 7/122* (2006.01)
(Continued)

(52) U.S. Cl.
CPC .............. *H02P 6/12* (2013.01); *B62D 5/0484* (2013.01); *B62D 5/0487* (2013.01);
(Continued)

(58) Field of Classification Search
CPC ...... H02P 6/12; H02H 7/0844; H02H 7/1225; B62D 5/0484; B62D 5/0487
(Continued)

(56) References Cited

U.S. PATENT DOCUMENTS 7,019,479 B2    3/2006  Tobias et al.
2009/0079373 A1*  3/2009  Nagase ................ B62D 5/0487
                                             318/400.22
(Continued)

FOREIGN PATENT DOCUMENTS

WO      03099632 A1    12/2003
WO   2010116182 A1    10/2010

OTHER PUBLICATIONS

Patents Act 1977: Search Report under Section 17(5), Application No. GB1416011.3, dated Feb. 24, 2015.
(Continued)

*Primary Examiner* — Kawing Chan
*Assistant Examiner* — Bradley Brown
(74) *Attorney, Agent, or Firm* — MacMillan, Sobanski & Todd, LLC

(57) ABSTRACT

A motor drive circuit for use in driving a motor having two or more phases comprising a motor bridge having, for each phase of the motor, a bridge arm comprising an upper switch and a lower switch that in normal operation may be opened and closed to modulate the voltage applied to the respective phases in response to drive signals from a motor control circuit, at least one solid state phase isolation relay that is provided in series in an electrical path connecting a respective phase of the motor to a respective bridge arm, the relay being closed in normal operation so that current can flow in the phase and is held open in a fault mode of operation to prevent the flow of current in the phase. The circuit also includes monitoring means for monitoring the current waveform in the phase to provide, at least in a fault mode of operation, an output indicative of when it is safe to open the SSPIR without causing damage due to the SSPIR due to an avalanche mode, and a control circuit that during normal operation applies a voltage to each device that is sufficient to hold the SSPIR closed and which, in the fault mode of (Continued)

operation, responds to the output of the monitoring means to reduce the voltage applied to each SSPIR to a level that causes the SSPIR to open at the safe time.

20 Claims, 10 Drawing Sheets

(51) Int. Cl.
    *B62D 5/04*           (2006.01)
    *H02H 7/08*           (2006.01)

(52) U.S. Cl.
    CPC ........ *H02H 7/0838* (2013.01); *H02H 7/0844* (2013.01); *H02H 7/1225* (2013.01)

(58) Field of Classification Search
    USPC ..................................................... 318/400.21
    See application file for complete search history.

(56) References Cited

U.S. PATENT DOCUMENTS

| | | | |
|---|---|---|---|
| 2012/0035801 A1 | 2/2012 | Browne et al. | |
| 2013/0134914 A1* | 5/2013 | Williams | H02P 6/007 318/400.13 |
| 2014/0077736 A1* | 3/2014 | Donner | H02H 7/1225 318/400.21 |
| 2014/0203860 A1* | 7/2014 | Senda | H03K 17/30 327/381 |

OTHER PUBLICATIONS

PCT International Search Report, Application No. PCT/GB2015/052604, dated Nov. 18, 2015.

Chinese First Office Action, Application No. CN 201580056900.0, dated Aug. 2, 2018.

\* cited by examiner

MOTOR DRIVE CIRCUITRY

CROSS-REFERENCE TO RELATED APPLICATIONS

This application is the National Phase of International Application PCT/GB2015/052604 filed Sep. 9, 2015 which designated the U.S. and that International Application was published in English under PCT Article 21(2) on Mar. 17, 2016 as International Publication Number WO 2016/038362 A1. PCT/GB2015/052604 claims priority to Great Britain Application No. 1416011.3, filed Sep. 10, 2014. Thus, the subject nonprovisional application claims priority to Great Britain Application No. GB 1416011.3, filed Sep. 10, 2014. The disclosures of both applications are incorporated herein by reference in their entirety.

BACKGROUND OF THE INVENTION

This invention relates to improvements in motor drive circuitry, especially but not exclusively for use in electric power assisted steering assemblies.

Electric power assisted steering systems are known of the kind in which an electric motor applies assistance torque to a part of the steering in order to assist the driver of the vehicle in turning the wheel. The motor may typically act upon the steering column or may act upon the steering rack, through a reduction gearbox. A measurement of the torque applied to the steering apparatus by the driver when turning the wheel is passed to a processor which produces a torque demand signal which is in turn used to control the motor to produce the required assistance torque. Applying an assistance torque of the same sense as the driver applied torque reduces the amount of effort needed to turn the wheel.

The motor, which may be a star or wye connected motor, such as a multiphase permanent magnet motor, is controlled by a motor control circuit and a motor drive circuit. The motor drive circuit comprises switches which can be opened and closed to connect the phases of the motor to a DC source, such as a battery or an earth, in response to a control pattern provided by the control circuit. Specifically, each phase is connected to a positive supply rail through a top transistor which when turned on connects the motor phase to a battery positive terminal connected to the positive supply rail. Similarly, each phase is connected through a bottom transistor to a negative supply rail through a bottom transistor. When switched on, the bottom transistor connects the phase to the negative rail which is in turn connected to a battery negative or earth. The two transistors—top and bottom—form one arm of a multiple arm bridge circuit that is the heart of the drive circuit. By opening and closing the switches it is possible to selectively and independently route current through each phase of the motor.

The control circuit comprises a digital or analogue circuit or some combination of both. The function of the control circuit is to supply control signals to the bridge transistors to open and close them in a pattern which in turn causes the current to flow through the phases as required for a given motor torque and speed. Generally the pattern will be set by the control circuit according to the motor position and the torque measured in the steering system by a torque sensor. Typically the pattern for each arm of the bridge comprises a pulse width modulated waveform.

An example of a typical prior art motor and drive circuit is shown in FIG. 1 of the drawings. A battery (not shown) supplies power to a 3 phase bridge with top switches 2, 3, 4 and bottom switches 5, 6, 7 which feed a 3 phase permanent magnet motor 8. The switches shown are MOSFETS but could be any other type of semiconductor switch such as Bipolar transistors. Where reference is made in this document to MOSFET devices the reader should understand that this is intended generally to cover any solid state relay or switch.

A problem with such an arrangement is that a fault mode can arise in which a top switch in an arm of the bridge and a bottom switch in another arm of the bridge may both be stuck in the closed position, resulting in a permanent path for DC current from the battery through the positive rail, through at least two phases of the motor and back to the negative rail. This can occur for many reasons, such as a fault in the control circuit resulting in a control pattern being applied to the drive circuit which is incorrectly instructing transistors to stay closed, or a faulty switch. When such a fault condition occurs the motor resists turning, making it difficult for the driver to turn the wheel.

To prevent the current being drawn from the supply along the path described in the previous paragraph, the remaining bridge switches could be placed in a fault mode where they are all turned OFF (i.e. open circuit). However, it is still possible for current to flow through the motor along a path as shown in FIG. 2 of the drawings. Due to the inductance of the Motor, any current flowing in the fault mode will continue to flow through the faulty bridge switch and the body diodes of two other top or bottom MOSFETs—dependant on the direction of current flow.

With no other source present, this fault current will decay to zero as energy is dissipated in the resistance of the motor windings and over the forward voltage drop of the conducting MOSFET body diodes. This is shown in FIG. 3.

However, this situation does not adequately isolate the Motor; continued (unassisted) steering input from the driver will rotate the motor, generating a back-emf voltage between windings. As soon as this back-emf exceeds the forward voltage of the MOSFET body diode (top or bottom MOSFET alongside the faulty MOSFET) current will again flow giving a half-wave rectified periodic current waveform, resisting the actions of the driver (Motor Damping). This is shown in FIG. 4 of the drawings.

This is an unacceptable situation which must be rectified within a short duration set by the applicable Safety Requirement.

To ensure that current cannot flow due to back EMF Vbemf1,2 as the motor is physically rotated, for example by a driver, it is known to place in each motor phase an additional isolation switch referred to in this text as a solid state phase isolation relay (SSPIR). This term encompasses a range of solid state switches including MOSFETS and bipolar transistors. When a fault has occurred, the drive circuit is placed in a fault event mode in which these switches are held open (non-conducting) to ensure no current can flow in the phase. A simple circuit with an isolation switch, herein referred to as a solid state phase isolation relay (SSPIR), in each phase, is shown in FIG. 5.

Although the use of SSPIRs would appear to be a perfect and total solution to the problem, the applicant has previously appreciated that an issue with an SSPIR arises when a SSPIR opens either intentionally or unintentionally whilst a high current is flowing through it. Under this circumstance, the voltage across the SSPIR will rise rapidly due to the increasing drain-source resistance in the moments before opening until the breakdown voltage of the switch is reached (avalanche condition), unless limited by external means. This combination of high voltage in the presence of high current flow results in a short high-power pulse. The energy contained within this pulse may result in the short-circuit failure of the SSPIR, defeating its purpose. This is shown in FIG. 6.

It is known to wait for the current in the motor to decay before opening the SSPIRs. However, this is not a total solution to the problem of possible short-circuit failure of the SSPIRs. Consider a representative automotive application based on a 12 volt supply battery where the bridge MOSFETS are opened as shown in FIG. 6 following detection of a faulty bridge MOSFET. Continued (unassisted) steering input from the driver will rotate the motor, generating a periodic back-emf voltage between windings. As soon as this back-emf exceeds the forward voltage of the MOSFET body diode (top or bottom MOSFET alongside the faulty MOSFET) current will again flow (half-wave rectified), resisting the actions of the driver (Motor Damping). This current may be high enough that any subsequent attempt to open the SSPIRs will cause them to enter an avalanche mode where the power dissipated exceeds the rating of the SSPIR, leading to catastrophic failure.

Attempts have been made in the past to overcome this limitation by providing a snubber circuit that absorbs the energy during an opening of an SSPIR that would otherwise lead to damage due to excessive power dissipation in the SSPIR. However, the provision of the snubber circuit in itself can cause problems where the snubber circuit cannot deal with the sudden changes in current, and in any event the introduction of additional components in the snubber increase costs and lead to more potential points of failure.

An object of the present invention is to ameliorate the problems associated with the use of SSPIRs without resorting to the use of additional snubber circuitry.

SUMMARY OF THE INVENTION

According to a first aspect the invention provides a motor drive circuit for use in driving a motor having two or more phases, the motor drive circuit comprising:

a motor bridge having, for each phase of the motor, a bridge arm comprising an upper switch and a lower switch that in normal operation may be opened and closed to modulate the voltage applied to the respective phases in response to drive signals from a motor control circuit, at least one solid state phase isolation relay SSPIR that is provided in series in an electrical path connecting a respective phase of the motor to a respective bridge arm, the SSPIR being closed in normal operation so that current can flow in the phase and is held open in a fault mode of operation to prevent the flow of current in the phase, characterized by comprising:

monitoring means for monitoring the current waveform in the phase to provide, at least in a fault mode of operation, an output indicative of when it is safe to open the SSPIR without causing damage due to the SSPIR due to an avalanche mode, and a control circuit that during normal operation applies a voltage to each device that is sufficient to hold the SSPIR closed and which, in the fault mode of operation, responds to the output of the monitoring means to reduce the voltage applied to each SSPIR to a level that causes the SSPIR to open at the safe time.

The invention therefore ensures that the SSPIR is not damaged on opening due to excessive power dissipation in the SSPIR, which is known to be a function of the product of the current that flows through the motor and the voltage dropped across the SSPIR. This is achieved by careful monitoring of the current waveform.

Where each phase is provided with a respective SSPIR, the monitoring means monitors the current waveform in each phase independently, so that the timing of opening of each SSPIR is independent of the other SSPIRs. Opening of each SSPIR may be done independently so they do not all have to open at the same time but only when safe to do so.

The current monitoring circuit that monitors the current flowing in each phase may monitor the amplitude of the current, or it may monitor the rate of change of current, either directly or indirectly. By directly we mean monitor the actual current or rate of change of current, and by indirectly we mean monitoring a parameter that varies as a function of the current or rate of change of current.

It is preferred that the monitoring means monitors a signal that is dependent on the rate of change of current, and in particular that the monitoring means determines when the signal dependent on the rate of change of current in a respective phase is negative. This event is indicating that the current is falling, and is an indicator that it is a safe time to open the SSPIR.

In one arrangement, the monitoring means may have a threshold rate of change of the signal it is monitoring which must be exceeded before the output indicates it is safe to open the switches. Thus, small fluctuations in the signal being monitored that do not cause the rate of change to exceed the threshold will not cause the output to be triggered.

In one preferred arrangement, the output signal from the monitoring circuit may comprise a two value switched output that has a first value when the voltage is below a detection threshold, and a second value when it is above the threshold and is falling. The change in this signal may provide the trigger for the control means to open the SSPIRs.

In one especially advantageous arrangement, the monitoring circuit monitors the current waveform by monitoring a signal indicative of the voltage dropped across the SSPIR. By this we mean the drain-source voltage if the SSPIR is a MOSFET device. This voltage will be a function of the resistance of the SSPIR and the current, and although the resistance may vary during monitoring this signal will be a function of current.

This is especially advantageous as it allows the current to be monitored without the need for any additional circuitry such as a dedicated current sense resistor having to be placed in series in the phase.

The signal monitored may be the actual dropped voltage, or a fraction of the actual voltage as measured across a potential divider.

The monitoring means may include a low pass filter through which the voltage signal is passed, the monitoring means monitoring the filtered signal. The signal monitored will then be a signal that is the derivative of the voltage dropped across the SSPIR, or a fraction of the voltage.

In a simple arrangement the current monitoring circuit may include an RC filter in which the resistance R is at least in part dependent on the device resistance.

By monitoring the rate of change of the device voltage and triggering if a threshold rate of negative change is exceeded, the current monitoring circuit will trigger if it detects that the current waveform has passed a peak and is dropping. For the rectified periodic waveform that occurs as the motor is turned by a driver this will signal a safe time as the current will be dropping to zero.

The applicant has appreciated that in normal operation with the SSPIR closed, the resistance dropped across the SSPIR will be very small and to monitor this would require a very sensitive monitoring circuit.

Therefore in a refinement, in order to provide a voltage that is easier to measure using less sensitive circuitry the control circuit may be configured so that after initiation of a fault mode the voltage applied to the gate is dropped gradually over time so that prior to reaching a voltage at which the SSPIR is opened it gradually passes through the threshold region in which the drain source resistance varies highly for small changes in gate voltage.

As it is difficult to control the voltage precisely to give a known resistance, and the risk of suddenly switching to a voltage where the resistance is too high and so an avalanche failure occurs, the control circuit may be arranged to slowly drop the voltage from a first voltage at or close to the threshold voltage, to a second voltage that is below the voltage at which the SSPIR opens. By slowly we mean that it drops from the threshold to the opening voltage over at least 20 milliseconds, or at least 50 milliseconds. This time may be chosen as a function of the rate of rotation of the motor, so that it takes at least two cycles of the current waveform to drop through the threshold region when the motor is at its maximum rated speed.

By threshold we mean the voltage at which the resistance-gate voltage curve shown, for example, in FIG. 16 passes the obvious knee and the resistance starts to rise at a much higher rate for a given change in base voltage (or base current in the case of a bipolar device) compared with when it is held at a voltage (or cu/r/rent) considerably above this threshold or knee voltage. For a typical device this will be around 4-5 volts, with a fully open voltage of around 2 volts or less. When fully open the resistance is in effect infinite.

The SSPIR control circuit may be configured, following the initiation of a fault mode of operation, to rapidly drop the voltage applied to the gate or base of each SSPIR to a level closer to the threshold of the SSPIR but above threshold voltage, and subsequently to more slowly reduce the voltage over time to pass though the threshold. Ideally this drop takes the voltage rapidly to a point just above the threshold, but to be safe it is best to drop to a voltage, say, 2-3 or so volts above the threshold and then drop gradually.

The rapid initial drop followed by slow drop ensures that the total time to naturally drop to a voltage at which the SSPIR is opened is not as long as it would be if the rapid drop was omitted for a given slow drop in voltage. This ensures the device naturally opens in an acceptable time period when the current is too low to trigger the monitor, whilst not dropping too fast for the monitoring circuit to be able to trigger before an avalanche condition is reached.

The control circuit for the SSPIR may include a reservoir capacitor that is connected to the gate or base of the SSPIR that following the start of a fault event provides a voltage of which a full or reduced proportion is applied to the gate prior to opening the SSPIR at or just above the threshold.

The control circuit may be configured to provide a path through which current is drawn from the reservoir capacitor to cause the gate voltage to drop gradually towards the SSPIR opening voltage through the threshold.

The rate of high initial drop and the slower following voltage drop at the gate may be selected to ensure that the SSPIR is opened after a predefined maximum period of time regardless of the current flowing in the phases, i.e. independent of any output from the monitoring means. This ensures the relay is opened when there is low current flowing, which would not be enough otherwise to trigger the output of the monitoring means. A typical time might be 100 milliseconds or less.

In one convenient arrangement, the SSPIR control circuit may be configured to apply a voltage from a fixed voltage source to the gate (for a MOSFET) or base (for a bipolar transistor) of the SSPIR that is a considerable voltage above the threshold voltage during normal operation of the motor to ensure that the SSPIR is closed. This ensures the SSPIRs allows current to flow through the phases. This voltage may be chosen to be at least 14 volts or more, above the threshold of the device. The initial rapid drop may then be around 4 or 5 volts to around 9-10 volts, for a SSPIR with a threshold of around 5 volts.

When a fault event is initiated the control circuit may isolate the gate from the fixed voltage supply. Where a reservoir capacitor is provided this will become the replacement voltage source. When connected to the supply, the reservoir capacitor will be kept topped up by the fixed voltage supply.

The SSPIR control means may include a clamp circuit associated with each SSPIR that rapidly opens the SSPIR at the safe time by rapidly dropping the voltage applied to the gate or base of the SSPIR. Where the voltage is set by a reservoir capacitor, the clamp circuit may be configured to provide a path through which current is rapidly drawn from the capacitor.

The clamp circuit is preferably configured so that the voltage at the gate drops to a level at which the SSPIR is opened in a time that is less than one half period of the rectified current waveform produced due to back emf when the motor is rotating at its peak design speed. This ensures it is fully turned off before the current will start to rise again. During clamping the slow gradual drop in voltage becomes a much more rapid drop.

Note that in the case where a bipolar transistor is used in place of a MOSFET, the controller will control the base current and not the voltage. The reader will understand this difference and any reference to controlling gate voltage in a MOSFET should also be understood to be a disclosure of an equivalent control of base current in a bipolar device.

As mentioned, the invention may provide an SSPIR in each phase of the motor, and the monitoring means and control means may control each SSPIR independently. Thus, the current waveform in each phase may be monitored so that each SSPIR is safely shut down.

The control means initiates the opening of the SSPIRs when a fault event is triggered. It is envisaged that this may be triggered by a variety of different events.

For example, the circuit may include a bridge monitoring means that generates a signal indicating that a switch of the bridge is not operating correctly, a bridge shutdown control means that, upon receiving the signal from the first monitoring means indicating that a switch of the bridge is not operating correctly opens the remaining switches of the bridge and holds the switches open, and outputs a signal that is used by the control circuit of the SSPIRs to initiate a fault event mode.

By a switch not operating correctly we mean that the switch is broken and is stuck closed, or that the switch is incorrectly being held closed by incorrect drive signals.

The bridge monitoring means may form a part of a diagnostic means which monitors the integrity of the drive circuit. This may be arranged to monitor one or more of the following operational parameters of the drive circuit:

The Diagnostic means may comprise circuitry that comprises at least two parts:
1) Diagnostic Sense circuitry for the voltage supply to the SSPIRs and for each Phase voltage provided by the Bridge; and
2) Diagnostic Trigger circuitry, which exercises the control means and monitoring means.

The Diagnostic circuitry and algorithms may be configured to verify the following functionality:

1) That the voltage Supply to the gate or base of each SSPIR can be switched and that it can provide sufficient voltage to maintain each SSPIR in the on-state regardless of the associated Phase voltage.
2) That, in the on-state, each SSPIR can provide connection between the associated Phase and Motor terminal.
3) That, in the off-state, each SSPIR can provide sufficient isolation between the associated Phase and Motor terminal.
4) That, following opening or each SSPIR, each SSPIR remains closed for a minimum duration sufficient for inductive fault currents to decay.
5) That, following initial shutdown of the bridge, each SSPIR will open with a maximum duration set by the Safety Requirement.
6) That, following initial shutdown of the bridge, each SSPIR can be triggered to open within a short duration (shorter than the durations associated with 4 and 5 above)
7) That, following initial shutdown of the bridge, each SSPIR has trigger sensitivity (to regenerated Motor currents) lying within "must operate" and "must not operate" levels.

In addition, the Diagnostic circuitry and algorithms must satisfy 1 through 7 above over the full operating temperature range and for Motor rotation at all angular velocities including zero and maximum.

The diagnostic circuitry may determine the integrity on start-up, or at run time, and operation of the drive circuit may be aborted if the circuit is considered defective.

The motor drive circuit may comprise a drive circuit of an electric power assisted steering system. The circuit may drive a motor which is connected to a steering wheel of the vehicle.

According to a second aspect the invention provides a method of driving a motor of the kind having multiple phases, each phase being connected to a bridge driver through a respective solid state phase isolation relay (SSPIR), the method comprising, in the event of a fault event being initiated, performing the following steps in order:

determining a time when the current flowing in each phase is at a level where it is safe to open the SSPIRs without causing damage due to the SSPIR entering an avalanche mode, and in the event that a safe time is identified opening the SSPIRs.

The method may comprise monitoring the current waveform flowing in each phase, or monitoring a signal that is a function of the current waveform, to detect when the current has passed a peak, and opening the SSPIR once the peak has been passed.

The method may comprise monitoring the current waveform indirectly by monitoring the voltage dropped across the SSPIR. This voltage will be dependent on the current and the resistance of the SSPIR, but by holding the resistance relatively constant or ensuring that it is gradually rising, any negative change in voltage will be a function of a negative change in current and indicate a safe time to open.

The method may comprise, following initiation of a fault event, dropping the gate voltage (or base current for a bipolar device) of the SSPIR to a threshold level where the device resistance varies steeply with changes in voltage, and monitoring the voltage dropped across the device at that time as the signal indicative of the current waveform.

The method may comprise detecting when the rate of change of that voltage exceeds a threshold negative value.

Various aspects of this invention will become apparent to those skilled in the art from the following detailed description of the preferred embodiment, when read in light of the accompanying drawings.

DETAILED DESCRIPTION OF THE PREFERRED EMBODIMENT

Figure 7:
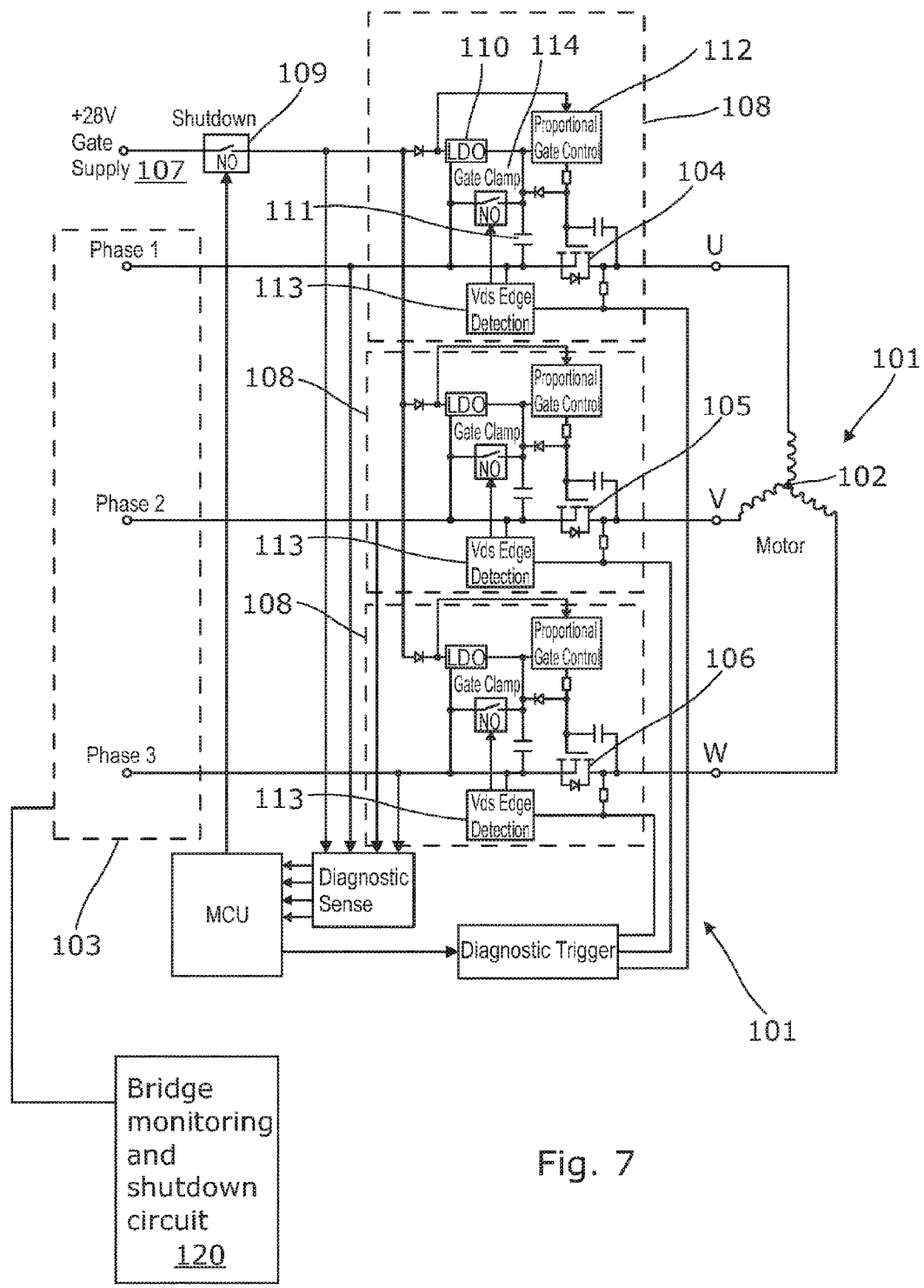
FIG. 7 is a schematic illustration of an embodiment of a motor drive circuit according to a first aspect of the present invention connected to a motor.

As shown in FIG. 7 a motor drive circuit 100 for use in an electric power assisted steering system is shown. The motor 101 comprise a three phase motor, having three phase U, V and W connected together at a common star point 102. The ends of each phase, not connected at the star point, are connected to respective branches of a motor bridge circuit 103 via a plurality of solid state phase isolation relays (SSPIRs) 104,105,106, one in series with each phase. The schematic shows for each SSPIR the internal diode and the Miller capacitance (associated with MOSFET devices) as separate elements.

Figure 1:
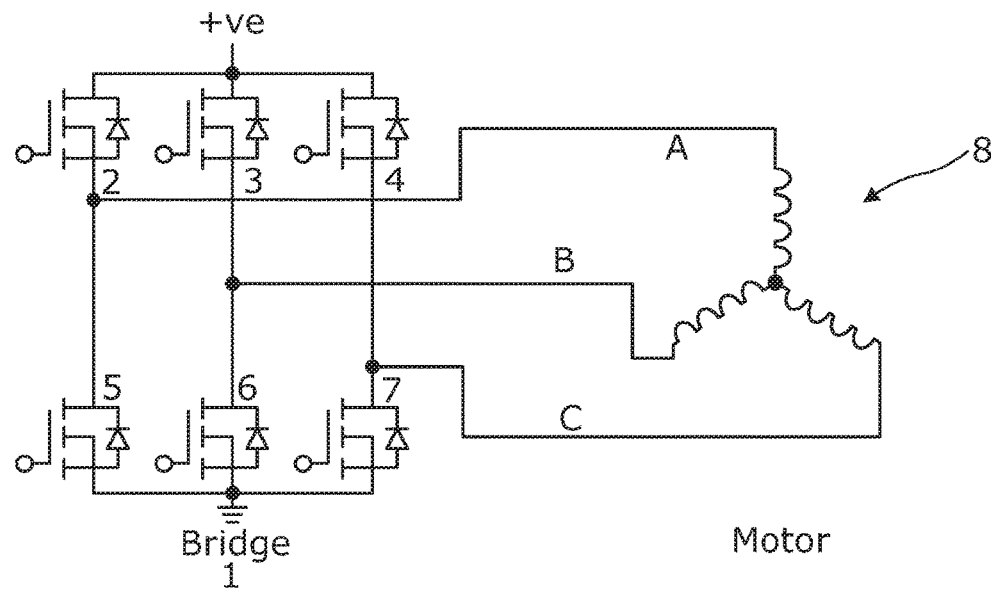
FIG. 1 is a general schematic representation of a prior art motor circuit for use in an automotive electric power assisted steering system.
Figure 2:
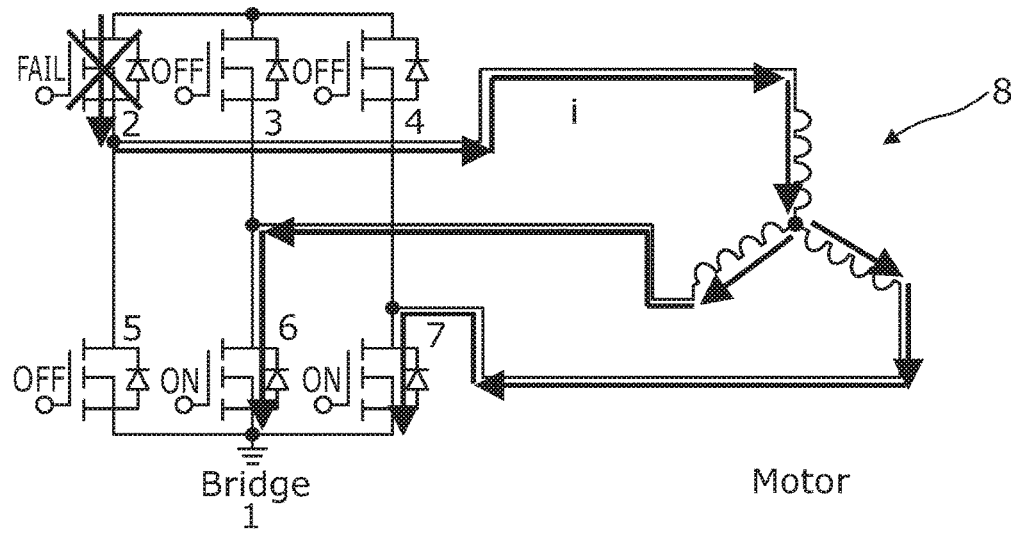
FIG. 2 is a schematic corresponding to FIG. 1 showing the potential path of current flowing round the motor when one of the switches is faulty.
Figure 3:
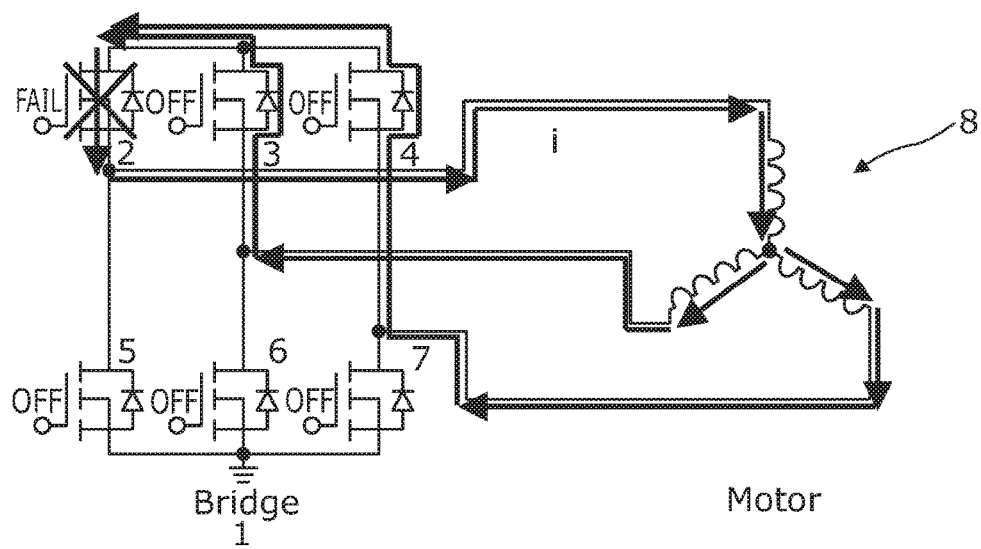
FIG. 3 is a schematic illustration corresponding to FIG. 1 showing an alternative path for current to flow even after the bridge has been closed caused by inductive decay of current in the motor associated with the motor inductance.
Figure 4:
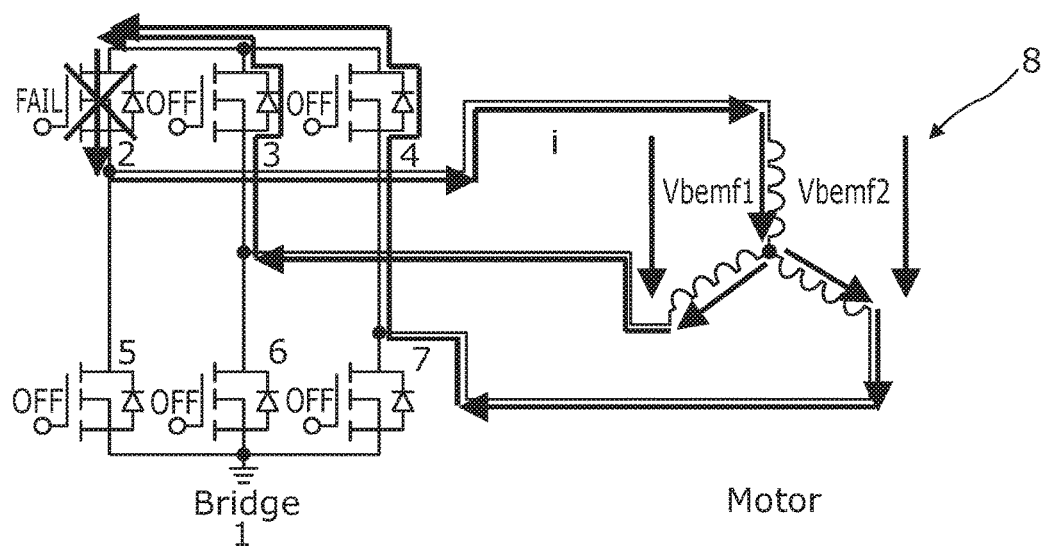
FIG. 4 is a schematic illustration also corresponding to FIG. 1 showing a further source of current flow due to back emf in the motor as it is rotated at speed.
Figure 5:
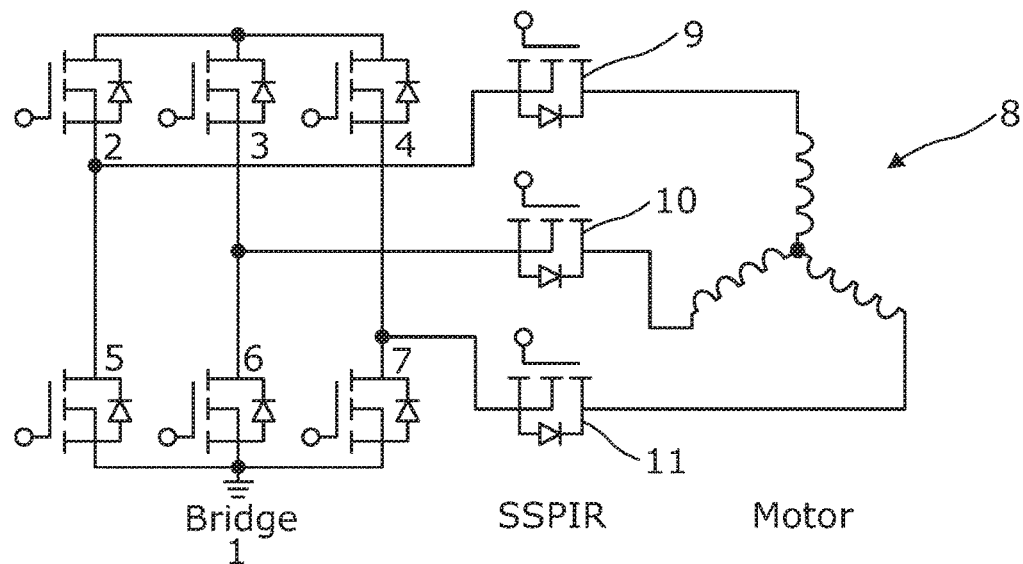
FIG. 5 is a schematic illustration of an alternative circuit in which each phase of the motor is protected by a serially connected switch between the motor phase and the bridge.
Figure 6:
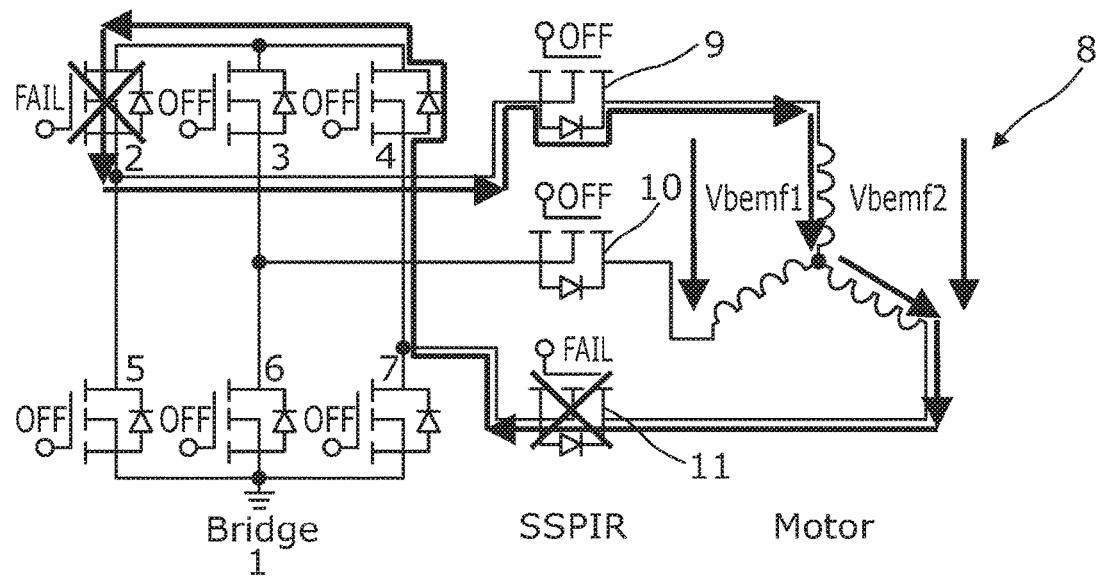
FIG. 6 is a schematic illustration corresponding to FIG. 5 showing a path for current flow due to back emf in the motor even when the bridge is closed.

The motor bridge circuit is not shown in detail but will typically be in line with that shown in FIG. 1. Each arm or branch comprises an upper portion which connects the motor to a positive side of a battery supply through a top MOSFET switch, and a lower portion which connects the motor phases to a negative side of the battery supply through a bottom MOSFET switch. The top and bottom switches in each arm enable the phase to be connected to the positive side by closing a top transistor and simultaneously opening the bottom one. They also enable it to be connected to the earth by closing the bottom transistor and simultaneously opening the top one. Similarly, they allow the phase to be left floating by simultaneously opening both the top and bottom transistors.

The opening and closing of the top and bottom MOSFETs of the bridge is controlled by a switching pattern applied to the switches by a control circuit (not shown) which is based upon a microprocessor and bridge driver. The pattern indicates whether each of the switches should be opened and closed at any time. Where MOSFET switches are used as illustrated the pattern may simply comprise a positive voltage applied between Gate-Source terminals of the transistor to close it, or zero voltage between Gate-Source terminals when the switch is to be closed. The choice of switching pattern depends on the position of the motor at any given time, the desired motor torque that is to be achieved, and the desired motor speed. Provided that the motor position and speed are measured and fed to the microprocessor, together with a torque demand signal indicative of the torque required from the motor. These measurements and signals are processed by the microprocessor to produce the desired patterns. Additional signals may be used to determine the desired inverter switching pattern. Such a control circuit is well known in the art, and so will not be discussed here in any detail.

Associated with the bridge is a diagnostic circuit 120. This comprises a monitoring means that determines an event in which a switch of the bridge is faulty, and a bridge shutdown control means that, upon receiving a signal from the first monitoring means indicating that a switch of the bridge is faulty opens the remaining switches of the bridge.

Figure 8:
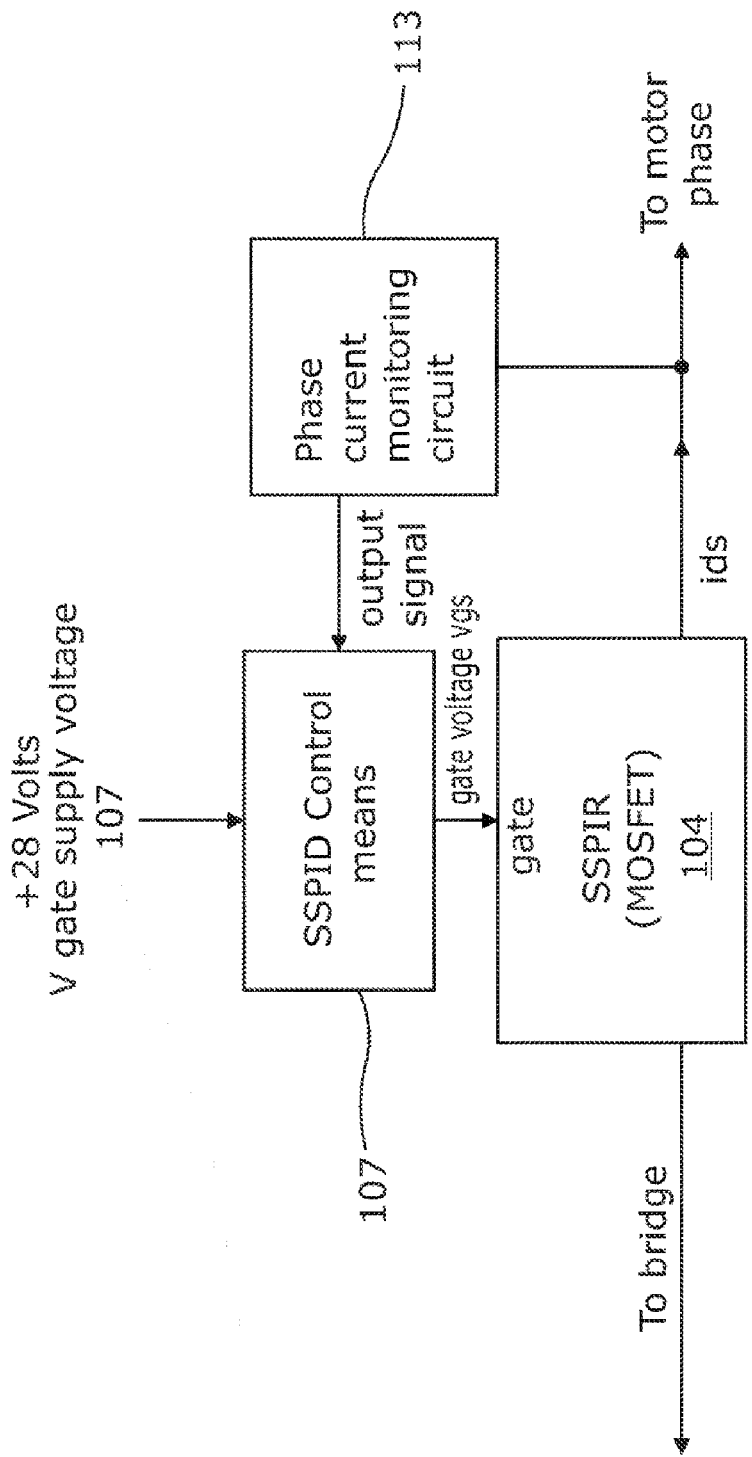
FIG. 8 is a schematic illustration of the control circuit associated with a single SSPIR.
Figure 17:
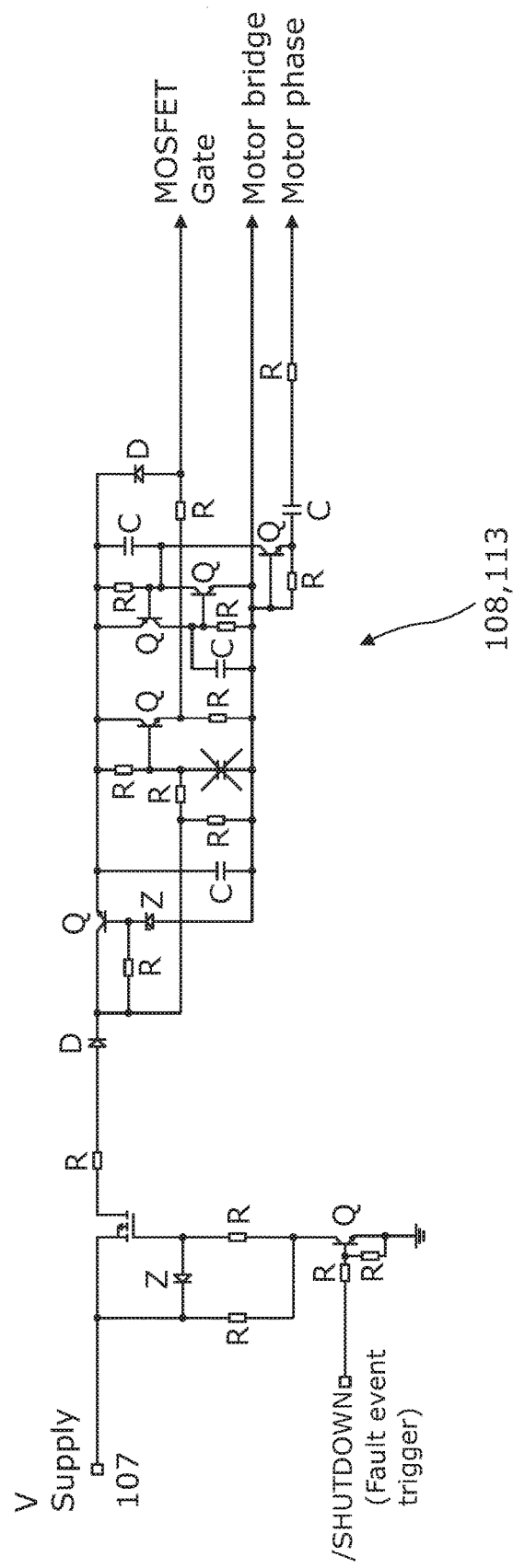
FIG. 17 is an exemplary control circuit and monitoring circuit for one SSPIR of the motor drive circuit, as used in the tests of FIGS. 11 to 15.

Each SSPIR is a solid state switch 104, 105, 106 that as shown comprises a MOSFET transistor. In use this is normally closed (drain-source conductive). The switches are held closed in normal operation by a voltage applied to the gate from an SSPIR control means 108. The control means is an analogue circuit in this example and is shown as a block in FIG. 8, and in more detail in FIG. 7. An exemplary circuit is shown in FIG. 17. The control circuit is arranged in three identical parts-one associated with each SSPIR. For convenience the operation of a single control circuit and SSPIR is given below, the two others working the same way.

The control circuit functions to hold the SSPIR closed in the normal mode of operation and open it safely when a fault event (shutdown) is triggered. The control circuit responds to an output signal from a respective monitoring circuit 113 that monitors a signal that is a function of the current flowing through the SSPIR to identify a safe time to open. Thus, the SSPIR is only opened by the control circuit 108 when it is safe to do so, defined as a time when the current and voltage across the SSPIR will not reach a level which, if enduring for long enough, will not cause the SSPIR to enter avalanche breakdown.

The gate supply voltage in this example is derived from a 28V supply, but must not exceed 20V at the gate (abs-max, 14-15V is typical), with the threshold of the device being around 4-5V as stated previously. In the normally closed state, the control means therefore applies a gate supply voltage, of, say 15 volts, to each MOSFET and in this mode each SSPIR has no significant effect on the operation of the motor, other than to provide a small fixed voltage drop across the closed MOSFET.

The operation of the control circuit 108 and monitoring circuit 113 will now be explained in more detail, with reference to the detailed circuit shown in FIG. 17.

As shown in the detailed schematic of FIG. 7 and in FIG. 17, the three identical parts of the control means share a common switch 109 that in normal operation with <Shutdown> disabled is closed. The switch 109 connects the Gate Supply voltage 107 via a reverse blocking diode to a low drop-out regulator (LDO) 110 which sets the on-state gate voltage at around 15 volts irrespective of the supply voltage which is nominally around 28 volts. The control means also includes a reservoir capacitor 111 that holds up the gate voltage in the event of brief dips in the Gate Supply.

The control circuit also includes a proportional gate control circuit 112 that is inoperative in the normal mode, and a gate clamp circuit 114 which is also inoperative in the normal mode. Although shown as separate blocks these are all an integral part of the control circuit for each SSPIR.

The monitoring means 113 in the example of FIG. 7 and FIG. 17 comprises an edge detection circuit 113 associated with each SSPIR that monitors indirectly the rate of change of current flowing through the SSPIR, and produces an output signal when the current is dropping above a threshold rate after reaching a peak. This indicates it is a safe time to open, and this signal is fed to the control means 108. When this signal indicates that the current has passed a peak, the control means responds by rapidly opening the switch by activating the gate clamp 112 that pulls the gate voltage rapidly down to a low voltage below that at which the SSPIR is opened (non-conducting).

In normal operation the diagnostic means simply watches the bridge, but if a MOSFET is identified is a faulty the shutdown control means forces all the other MOSFETS to an open (non-conducting condition). This is a first stage of protection of the motor, an initiation of a <shutdown> event. After that event has been initiated the SSPIRs are opened to give additional protection but only when it is determined that it is safe to do so. This two stage, controlled opening of switches ensures that a high degree of protection is given with a low risk of damage to the switches.

Following initiation of a <Shutdown> fault event, immediately after the bridge switches have been opened, the control means opens the switch 109 and so isolates the gate supply voltage for each SSPRI from the gate. This in turn causes the Proportional Gate Control circuit that forms a part of the SSPIR control circuit to become active. This control circuit at that time switches from providing the full on-state gate voltage to a variable proportion of that held on the reservoir capacitor 111, that is around the gate threshold level. For instance if the threshold is 4-5 volts, the voltage at the gate drops to around $\frac{2}{3}^{rd}$ of the capacitors 15 volts by the proportional control circuit, which is greatly reduced but still above the threshold by a safe margin as the start of the slow drop.

As time passes following the start of <Shutdown>, the voltage on the reservoir capacitor 111 decays over time. The Proportional Gate Control circuit 112 continues to supply an ever-smaller proportion of the voltage at the reservoir capacitor, such that the gate voltage reaches the off-state (i.e. SSPIR open) within the duration set by the applicable Safety Requirement (100 ms typical).

As the gate voltage drops, it will pass through the threshold region, by which we mean the region where the on-state resistance (Rds-on) of the SSPIR MOSFET rises. Any fault current due to Motor regeneration will cause a steadily increasing voltage waveform across the SSPIR (Vds). The monitoring means monitors this voltage once it exceeds a detection threshold. This is the signal that indirectly indicates what the current waveform is doing, since the voltage depends on resistance and current.

Fault current causing a positive-going rise in Vds will also cause a rise in gate voltage (Vgs) due to the inherent Miller capacitance (drain-gate capacitance) of the SSPIR MOSFET and the relatively high impedance of the Proportional Gate Control circuit. This results in a momentary reduction in Rds-on, limiting the rise of Vds. This effect may be enhanced by additional external drain-gate capacitance as shown. This mechanism ensures that the switch is not opened at a time when an increasing fault current is flowing, because the drop in gate voltage is halted due and hence the gradual opening is halted.

Eventually, the current in the phase will drop. This is because the back emf is proportional to rpm (which is typically dropping once a fault event has been triggered because the bridge at that time will generally be disabled), plus the SSPIR resistance rises as the gate voltage drops, increasing the on State resistance of the device which is related to the current by the function I=V/R. This drop in current is monitored indirectly by the monitoring means (the circuit marked edge detection in FIG. 7) which detects the negative-going Vds waveform. Once this is detected to be above a threshold level (set by the Vds Edge Detection circuit), the monitoring circuit outputs a signal to a gate clamp that forms part of the SSPIR control circuit that triggers the clamp circuit 114 that is in this example a "thyristor-like" Gate Clamp circuit. The Gate Clamp circuit rapidly discharges both the reservoir capacitor and, via a diode, the voltage on the SSPIR MOSFET gate. This rapidly opens the SSPIR.

It is safe to assume that the drop in the Vds voltage corresponds to a drop in current because, although the absolute device resistance is unknown it is known that it is gradually rising over time and so in itself cannot lead to a high rate of fall of the voltage, indeed it would contribute to an increasing voltage for a steady current. The voltage is therefore suitable for use in indirectly monitoring the current waveform, and using the SSPIR in this way eliminates the need for a separate current sense resistor.

To meet applicable Safety Integrity Level (SIL) requirements, correct functioning of the SSPIR control circuit must be verifiable at power-on and at other times, according to the requirement.

Figure 9:
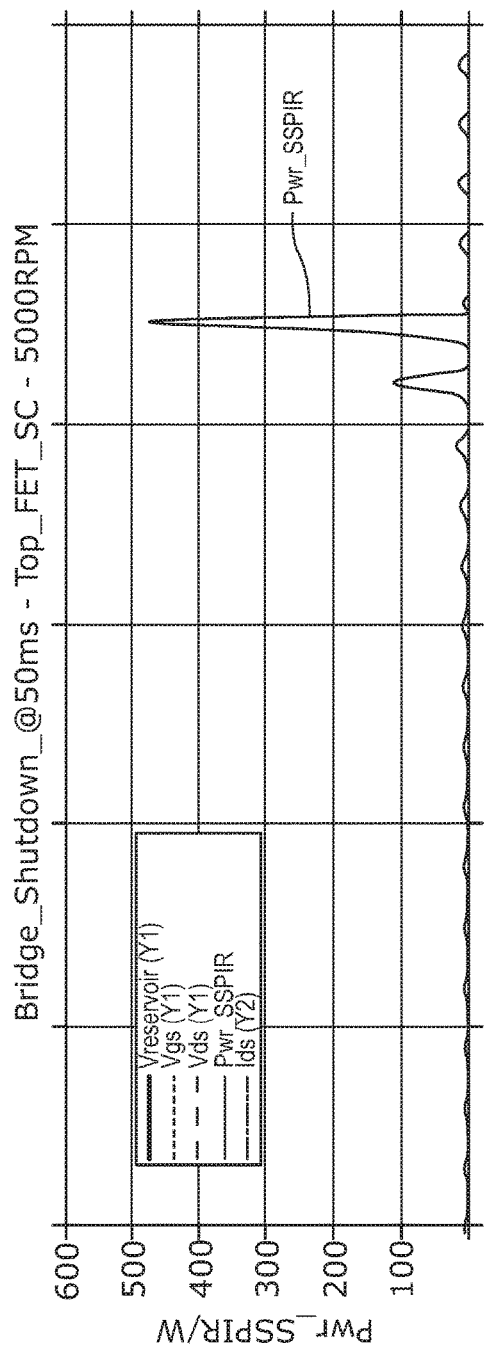
FIG. 9 is a plot of the power dissipated across a single SSPIR against time following opening of the bridge switches that initiates a fault event at time t=50 mseconds when the motor is rotating at, in this example, a maximum expected speed of 5000 rpm.
Figure 10:
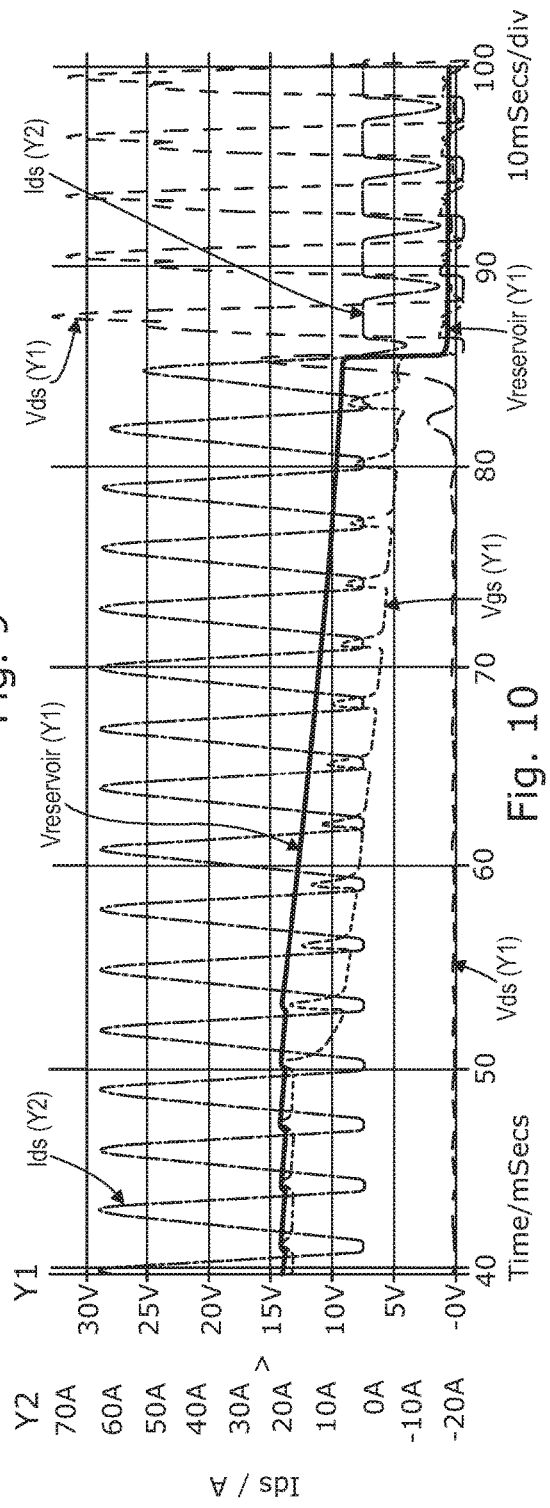
FIG. 10 is a plot of the voltages and current in the device over time for the event plotted in FIG. 9.

FIGS. 9 and 10 show the operation of the motor drive circuit of FIG. 7 in a typical fault event. In this example, the bridge circuit is shut down at time t=50 mseconds which prompts an immediate operation of the control means for the SSPIR into a fault event mode. The plots correspond to only one SSPIR and include the power PWR_SSPRI, the drain-source current Ids corresponding to the current in the phase, the gate voltage Vgs, the Voltage on the reservoir capacitor Vreservoir, and the voltage dropped across the device from draining to source Vds.

Figure 16:
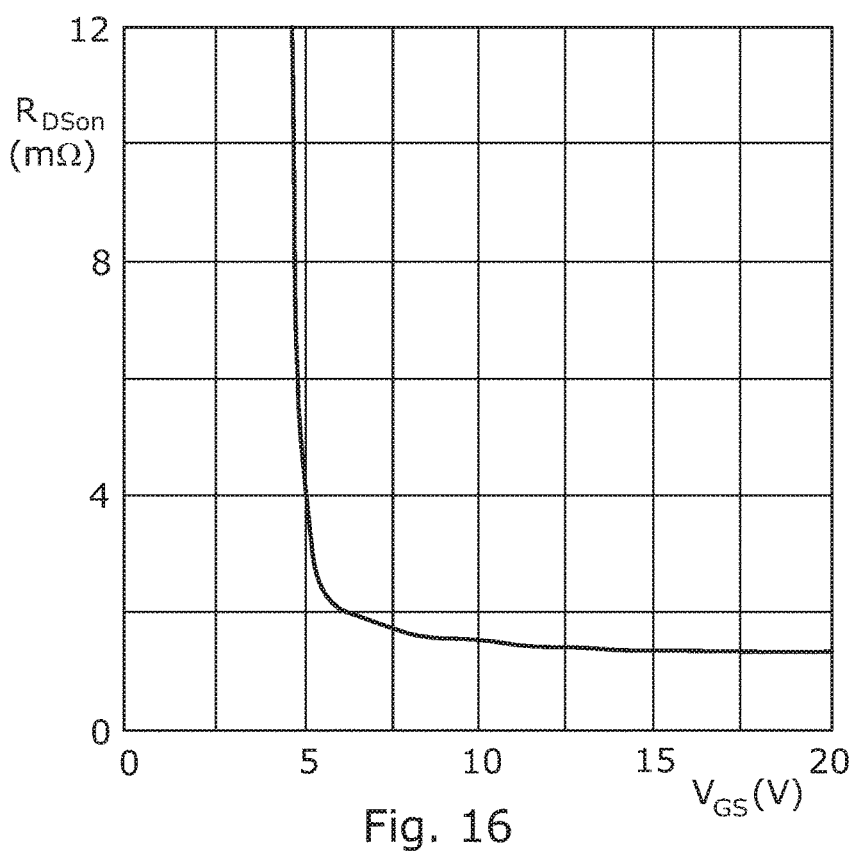
FIG. 16 is graph showing SSPIR drain-source resistance varying with the gate voltage (voltage gate-source) and showing the threshold at which the resistance rapidly starts to rise as voltage drops below about 5 volts.

Prior to the fault event the gate of the SSPIR is held at approximately 14 volts as set by the LDO charging the reservoir capacitor. This is considerably higher than the threshold voltage which is about 4-5 volts for a typical MOSFET as shown in FIG. 16 (the region of the obvious knee in the graph). On the start of the fault event, the proportional gate control starts and the gate voltage is rapidly dropped to a proportion of the voltage held on the reservoir capacitor voltage. In this case the voltage drops about 5 volts below the capacitor voltage, i.e. to around 10 volts and then decreases slowly towards the threshold of about 5 volts as the capacitor voltage gradually decreases. This can be seen to then gradually decrease over time as the reservoir current is drawn off up to about 80 milliseconds. Note that in this example the SSPIR has a threshold of around 5 volts, so the voltage is clearly around that level yet well above the level at which the SSPIR is opened which in this example is around 2 volts.

The phase current, Ids, varies periodically and is due to the back emf as the motor rotates at 5000 rpm. After approx 40 milliseconds, the gate voltage drops below the threshold voltage to the extent that the device resistance rapidly rises. This rise in resistance causes the power in the device to rise rapidly although this is kept in check by the effect of the miller capacitance in the device causing the gate voltage to rise, thus reducing the resistance.

As soon as the phase current in that cycle starts to drop, at around 85 milliseconds, the threshold detector triggers the clamp. This then rapidly deletes the charge in the reservoir capacitor which causes the gate voltage to drop below the 4 volt level at which the SSPIR is open in this example.

The switch is therefore rapidly opened but only when it is safe to do so. The power in device does not rise above 500 watts for any significant time. This limitation of the power and the duration of the power pulse together are what prevents an avalanche fault occurring.

The limit in this particular implementation is ~800 mJ (e.g. a mean power of 800 W over 1 ms, say), or ~400 mJ when operating at high temperature (designed to operate within this lower limit).

To understand the operation more clearly, FIGS. 11 to 15 are test plots obtained during various motor operation conditions from start of a fault event to the SSPIR opening obtained on a test rig simulating an electric power assisted steering system. The rig included a motor with a maximum rated speed of rotation when forced around by a driver of 5000 rpm, and a drive circuit with the control and monitoring circuit configured in accordance with FIG. 17. Each SSPIR MOSFET had a threshold of around 4-5 volts, and an Open gate voltage of 2 volts or less. A gate supply voltage of 28 volts was used, and the capacitor controlled the proportional controller to drop rapidly to 10 volts (some 4 volts or so above the threshold) before being drained over the next 100 milliseconds or so.

Figure 11:
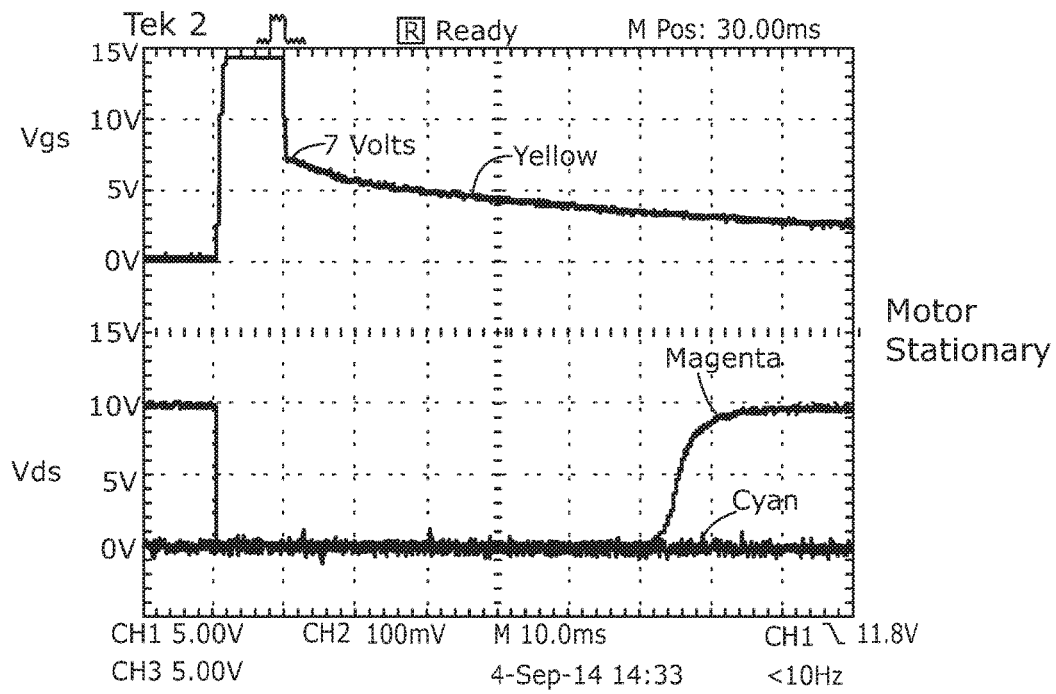
FIG. 11 is a plot of the gate-source voltage, Vgs, drain-source voltage Vds, and drain source current Ids, against time, for a test operation of a test rig in which a fault event is triggered and the motor is idle.

FIG. 11 shows the results of a first test in which </Shutdown> is removed for 10 ms (10 ms per division), with the motor idle.

Yellow trace is Vgs (gate voltage), 5V per division. It rises and holds at 14V for 10 ms, falls rapidly to ~7V (i.e. 7 volts are immediately removed by the "proportional gate drive cct"), then decays slowly (tracking the reservoir cap decay less 7V), reaching 3V after a further 70 ms.

Magenta is Vds (drain-source voltage), 5V per division. In the test setup, it drops from 10V to 0V immediately on release of </Shutdown> then rises slowly over 20 ms (i.e. slow switch-off), beginning ~50 ms after </Shutdown> is asserted with Vgs at ~3.5V.

Cyan is Ids (drain current), 20 A per division derived from 100 mV p-d across a 5 mΩ resistor for the purpose of taking the measurement on the test circuit. It remains at zero throughout (motor stationary).

Figure 12:
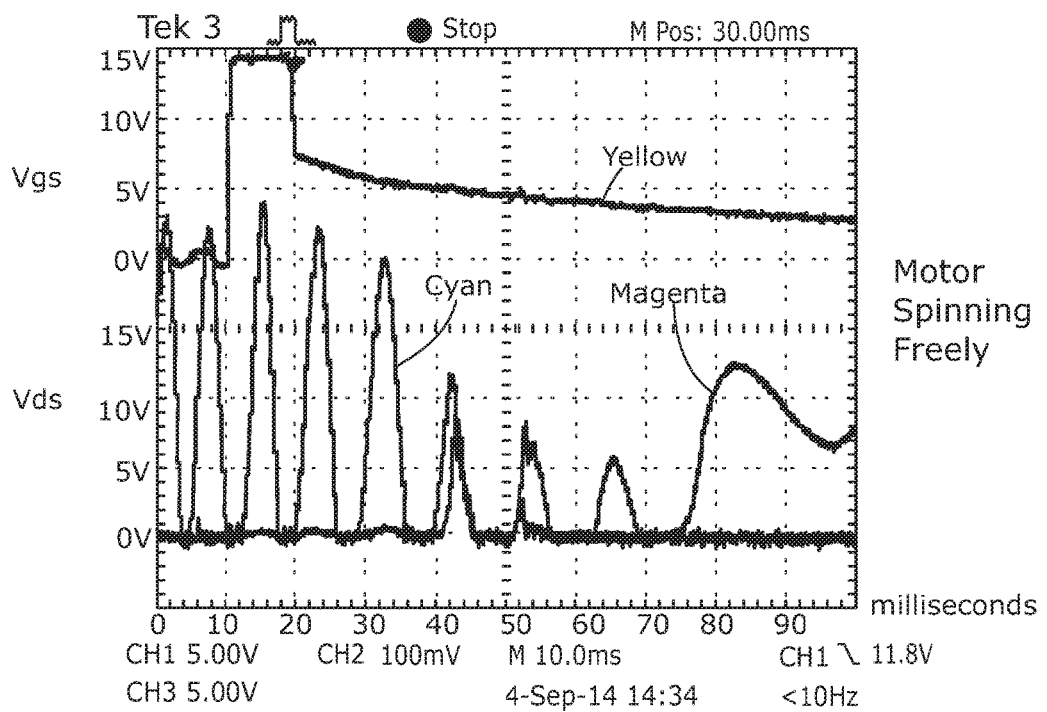
FIG. 12 is a similar set of plots to FIG. 11 for a repeat test in which the motor is spinning freely.

FIG. 12 shows the motor spinning freely prior to </Shutdown> removal (and effective Bridge fault insertion). The initial fault current due to the phase-phase open circuit back-emf of 22V (just prior to fault insertion) is ~96 A peak. This fault current introduces opposing torque, braking the motor such that the current peak only reaches ~10 A after 40 ms. No trigger occurs, the SSPIR opens naturally at some point after 60 ms, evidenced by Vds no-longer returning to zero.

Figure 13:
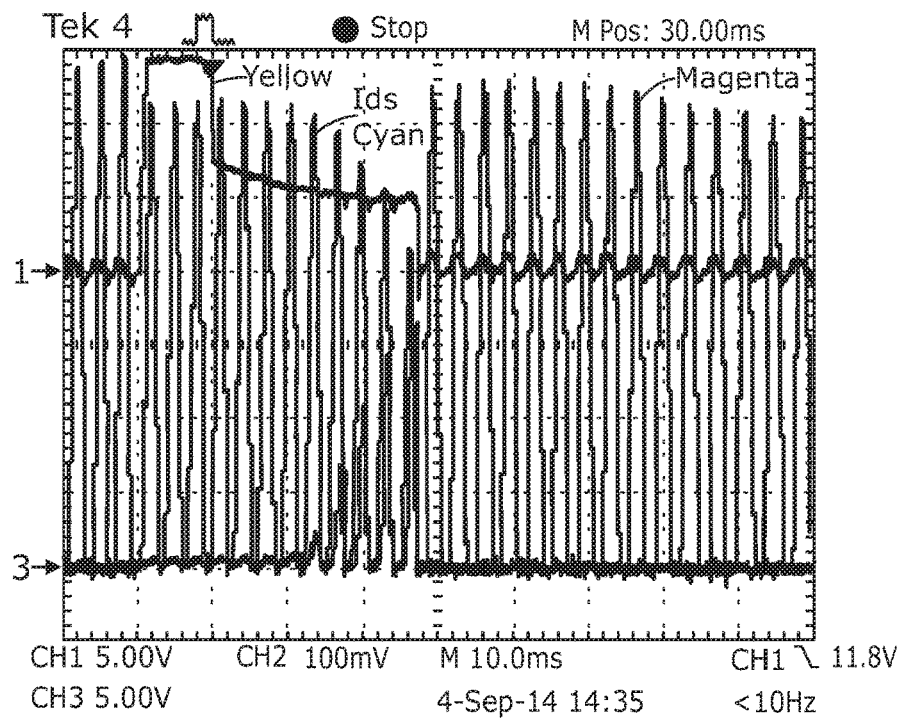
FIG. 13 is a similar set of plots to FIG. 11 for a repeat test in which the motor is being forcibly turned at high speed by a driver.

FIG. 13 shows the test repeated for the case where the motor is spinning with significant driver input. Initial current peaks of 125 A are sustained for 20 ms, and only appear to decay as Rds rises, evidenced by a rising Vds signal.

Figure 14:
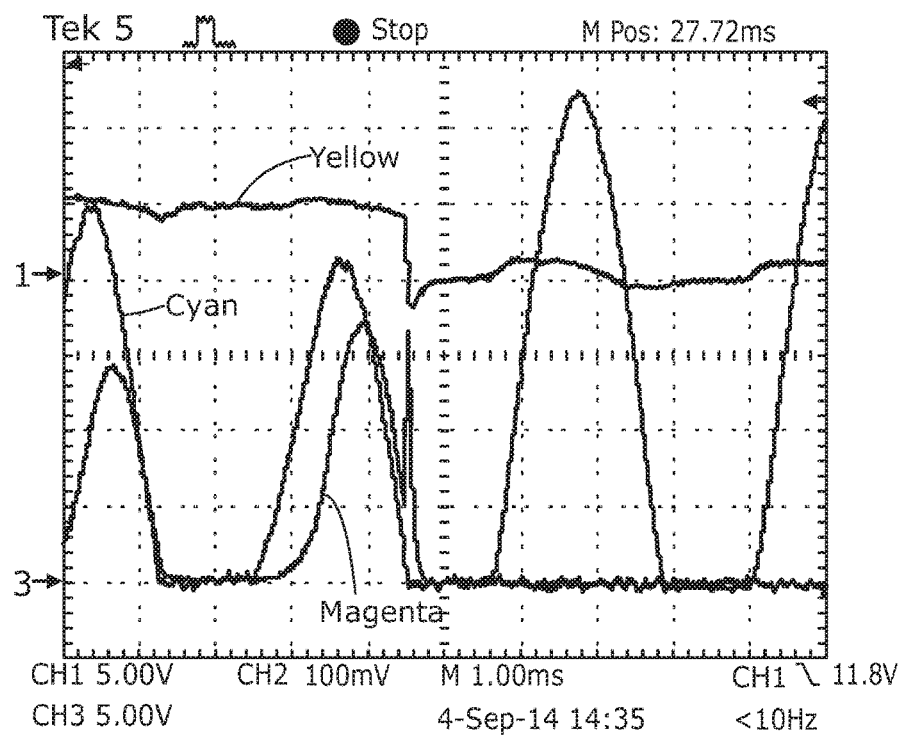
FIG. 14 is an enlarged view of the plots of FIG. 13.

FIG. 14 is the same test results as FIG. 13, zoomed-in (1 ms/div) to show the triggering and rapid gate turn-off around 28 ms following </Shutdown>. There is a narrow spike in Vds, due to the remaining 10 A of fault current, which disappears almost immediately due to the high negative dI/dt bringing the current rapidly to zero.

The effect of Miller capacitance can be seen here aiding the turn-off, causing a negative undershoot of the gate voltage (−2V).

Figure 15:
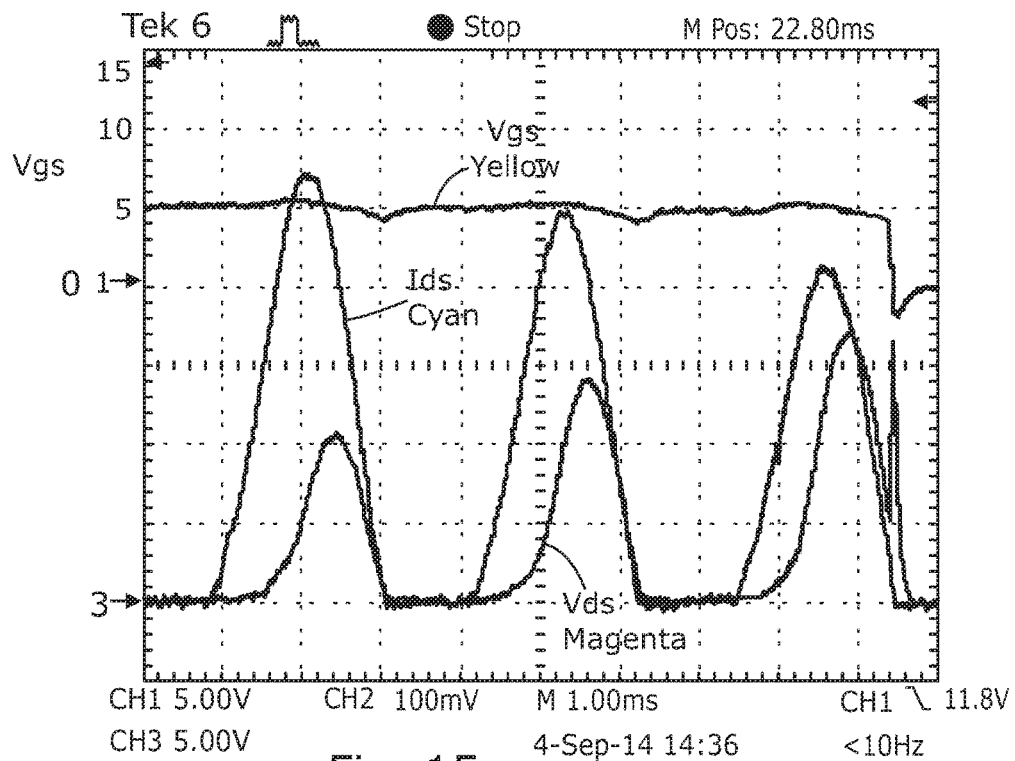
FIG. 15 is an alternative enlarged view of the plots of FIG. 13.

Finally, FIG. 15 is also the same run as FIG. 13. The effect of Miller capacitance can clearly be seen in the Vgs ripple, rising slightly with each positive going current pulse, causing associated Vds rise to be suppressed/delayed, whereas the fall in Ids causes a simultaneous fall in Vgs and Vds. After Ids reaches zero, Vgs recovers from its negative dip in around 5 ms, returning to the steady exponential decay curve.

It will be understood that the above example is not intended to be limiting to the scope of protection, For instance, while the example uses MOSFETs as the SSPIRs a bipolar transistor could be used. In that case, rather than varying the gate voltage the control means would vary the base current. This could be easily achieved using the circuit shown by a small modification in which the reservoir capacitor supplies the base current through a resistor. Any reference to gradually dropping the gate voltage may therefore be replaced as an equivalent by reference to gradually dropping the gate current.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A motor drive circuit for use in driving a motor having two or more phases, the motor drive circuit comprising:
   a motor bridge having, for each phase of the motor, a bridge arm comprising an upper switch and a lower switch that in normal operation may be opened and closed to modulate the voltage applied to the respective phases in response to drive signals from a motor control circuit;
   at least one solid state phase isolation relay (SSPIR) that is provided in series in an electrical path connecting a respective phase of the motor to a respective bridge arm, the SSPIR being closed in normal operation so that current can flow in the phase and is held open in a fault mode of operation to prevent the flow of current in the phase,
   a monitoring means for monitoring the current waveform in the phase to provide, at least in a fault mode of operation, an output indicative of a safe time when it is safe to open the SSPIR without causing damage due to the SSPIR due to an avalanche mode, and
   a control circuit that during normal operation applies a voltage to each device that is sufficient to hold the SSPIR closed and which, in the fault mode of operation, responds to the output of the monitoring means to reduce the voltage applied to each SSPIR to a level that causes the SSPIR to open at the safe time,
   in which the control circuit is configured so that after initiation of a fault mode, one of the voltage applied to a gate or current applied to a base for a bipolar device is dropped gradually over time so that prior to reaching the respective voltage or current at which the SSPIR is opened it gradually passes through a threshold region in which one of a drain-source resistance and a collector-emitter resistance varies highly for small changes in one of the gate voltage and the base current.

2. A motor drive circuit according to claim 1 in which each phase is provided with a respective SSPIR, and the monitoring means monitors the current waveform in each phase independently, so that the timing of opening of each SSPIR is independent of the other SSPIRs.

3. A motor drive circuit according to claim 1 in which the current monitoring circuit that monitors the current flowing in each phase monitors the rate of change of current, either directly or indirectly.

4. A motor drive circuit according to claim 3 in which the monitoring means determines when the signal dependent on the rate of change of current in a respective phase is negative.

5. A motor drive circuit according to claim 4 in which the monitoring means has a threshold rate of change of the signal it is monitoring which must be exceed before the output indicates it is safe to open the switches.

6. A motor drive circuit according to claim 1 in which the monitoring circuit monitors the current waveform by monitoring a signal indicative of the voltage dropped across the SSPIR.

7. A motor drive circuit according to claim 6 in which the monitoring means includes a low pass filter through which the voltage signal is passed as a filtered signal, the monitoring means monitoring the filtered signal.

8. A motor drive circuit according to claim 7 in which the low pass filter comprises an RC filter in which the resistance (R) is at least in part dependent on the SSPIR resistance.

9. A motor drive circuit according to claim 1 in which the control circuit is arranged to slowly drop the respective voltage or base current from a first respective voltage or first base current above one of a respective threshold voltage or threshold base current, to a second voltage or second base current that is below the value at which the SSPIR opens.

10. A motor drive circuit according to claim 1 in which a rate of fall of the respective gate voltage or base current is chosen as a function of a rate of rotation of the motor, so that it takes at least two cycles of the current waveform to drop through the threshold region when the motor is at its maximum rated speed.

11. A motor drive circuit according to claim 1 in which the control circuit is configured, following the initiation of a fault mode of operation, to rapidly drop the gate voltage or base current applied to the gate or base of each SSPIR to a level closer to the threshold of the SSPIR but above the device opening value, and subsequently to more slowly reduce the value over time to pass though the threshold.

12. A motor drive circuit for use in driving a motor having two or more phases, the motor drive circuit comprising:
   a motor bridge having, for each phase of the motor, a bridge arm comprising an upper switch and a lower switch that in normal operation may be opened and closed to modulate the voltage applied to the respective phases in response to drive signals from a motor control circuit;
   at least one solid state phase isolation relay (SSPIR) that is provided in series in an electrical path connecting a respective phase of the motor to a respective bridge arm, the SSPIR being closed in normal operation so that current can flow in the phase and is held open in a fault mode of operation to prevent the flow of current in the phase,
   a monitoring means for monitoring the current waveform in the phase to provide, at least in a fault mode of operation, an output indicative of a safe time when it is safe to open the SSPIR without causing damage due to the SSPIR due to an avalanche mode, and
   a control circuit that during normal operation applies a voltage to each device that is sufficient to hold the SSPIR closed and which, in the fault mode of operation, responds to the output of the monitoring means to reduce the voltage applied to each SSPIR to a level that causes the SSPIR to open at the safe time,
   in which the control circuit for the SSPIR includes a reservoir capacitor that is connected to the gate or base of the SSPIR that following the start of a fault event provides a voltage or current of which a full or reduced proportion is applied to the gate or base prior to opening the SSPIR at or just above the threshold.

13. A motor drive circuit according to claim 12 in which the control circuit is configured to provide a path through which current is drawn from the reservoir capacitor to cause the gate voltage to drop gradually towards the SSPIR opening voltage through the threshold.

14. A motor drive circuit according to claim 1 in which the SSPIR control circuit includes a clamp circuit associated with each SSPIR that rapidly opens the SSPIR at the safe time by rapidly dropping the voltage/current applied to the gate or base of the SSPIR.

15. A method of driving a motor of the kind having multiple phases, each phase being connected to a bridge driver through a respective solid state phase isolation relay (SSPIR), the method comprising, in the event of a fault event being initiated, performing the following steps in order:
   determining a time when the current flowing in each phase is at a level where it is safe to open the SSPIRs without causing damage due to the SSPIR entering an avalanche mode, and in the event that a safe time is identified opening the SSPIRs;
   further comprising the step of, following initiation of a fault event, dropping the gate voltage or base current for a bipolar device of the SSPIR to a threshold level where the device resistance varies steeply with changes in voltage, and monitoring the voltage dropped across the device at that time as the signal indicative of the current waveform.

16. A method according to claim 15 which further comprises the step of monitoring the current waveform flowing in each phase, or monitoring a signal that is a function of the current waveform, to detect when the current has passed a peak, and opening the SSPIR once the peak has been passed.

17. A method according claim 15 which further comprises the step of monitoring the current waveform indirectly by monitoring a signal dependent on the voltage dropped across the SSPIR.

18. A motor drive circuit according to claim 12 in which each phase is provided with a respective SSPIR, and the monitoring means monitors the current waveform in each phase independently, so that the timing of opening of each SSPIR is independent of the other SSPIRs.

19. A motor drive circuit according to claim 12 in which the current monitoring circuit that monitors the current flowing in each phase monitors the rate of change of current, either directly or indirectly.

20. A motor drive circuit according to claim 12 in which the monitoring means determines when the signal dependent on the rate of change of current in a respective phase is negative.

* * * * *